(12) United States Patent
Han et al.

(10) Patent No.: US 9,998,222 B2
(45) Date of Patent: Jun. 12, 2018

(54) OPTICAL SIGNAL TRANSMISSION SYSTEM AND METHOD OF ALLOCATING CENTER FREQUENCIES OF INTERMEDIATE FREQUENCY (IF) CARRIERS FOR FREQUENCY DIVISION MULTIPLEXING (FDM) OPTICAL FIBER LINK

(71) Applicant: ELECTRONICS AND TELECOMMUNICATIONS RESEARCH INSTITUTE, Daejeon (KR)

(72) Inventors: Chan Gyo Han, Daejeon (KR); Min Kyu Sung, Seoul (KR); Jong Hyun Lee, Daejeon (KR); Hwan Seok Chung, Daejeon (KR); Seung Hyun Cho, Sejong (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days. days.

(21) Appl. No.: 15/245,315

(22) Filed: Aug. 24, 2016

(65) Prior Publication Data
US 2017/0244486 A1 Aug. 24, 2017

(30) Foreign Application Priority Data
Feb. 23, 2016 (KR) .................. 10-2016-0021359

(51) Int. Cl.
*H04B 10/2513* (2013.01)
*H04J 1/02* (2006.01)
*H04J 14/02* (2006.01)

(52) U.S. Cl.
CPC ........... *H04B 10/2513* (2013.01); *H04J 1/02* (2013.01); *H04J 14/0227* (2013.01)

(58) Field of Classification Search
CPC ...... H04B 10/2513; H04J 14/0227; H04J 1/02
See application file for complete search history.

(56) References Cited

U.S. PATENT DOCUMENTS 5,608,562 A * 3/1997 Delavaux ........... G02B 6/29376
398/148
7,945,172 B2 * 5/2011 Huang ............. H04B 10/25133
372/33

(Continued)

OTHER PUBLICATIONS

E. E. Bergmann et al. "Dispersion-Induced Composite Second-Order Distortion at 1.5um", IEEE Photonics Technology Letters, vol. 3, No. 1, Jan. 1991.

*Primary Examiner* — Danny Leung
(74) *Attorney, Agent, or Firm* — LRK Patent Law Firm

(57) ABSTRACT

An optical signal transmission system and method of allocating center frequencies of intermediate frequency (IF) carriers in a frequency division multiplexing (FDM) optical fiber link. The optical signal transmission method includes determining a center frequency interval between modulated signals based on a bandwidth of the modulated signals or a center frequency of a modulated signal having a lowest center frequency, among the modulated signals, reallocating center frequencies to the modulated signals based on the center frequency interval between the modulated signals, and converting the modulated signals reallocated the center frequencies from electrical signal into optical signal and transmitting the optical signal.

10 Claims, 7 Drawing Sheets

(56) References Cited

U.S. PATENT DOCUMENTS

| | | | | |
|---|---|---|---|---|
| 8,521,040 B2* | 8/2013 | Youn | .................. | H04B 10/6971 |
| | | | | 398/208 |
| 8,620,158 B2* | 12/2013 | Peach | .............. | H04B 10/25758 |
| | | | | 398/183 |
| 2012/0201541 A1* | 8/2012 | Patel | .................. | H04J 14/0212 |
| | | | | 398/58 |
| 2013/0051804 A1* | 2/2013 | Chung | ............... | H04B 10/5563 |
| | | | | 398/79 |
| 2014/0270776 A1* | 9/2014 | Jinno | .................. | H04J 14/0204 |
| | | | | 398/69 |
| 2015/0163769 A1* | 6/2015 | Lee | ...................... | H04W 72/04 |
| | | | | 370/329 |
| 2017/0244486 A1* | 8/2017 | Han | .................. | H04B 10/2513 |

* cited by examiner

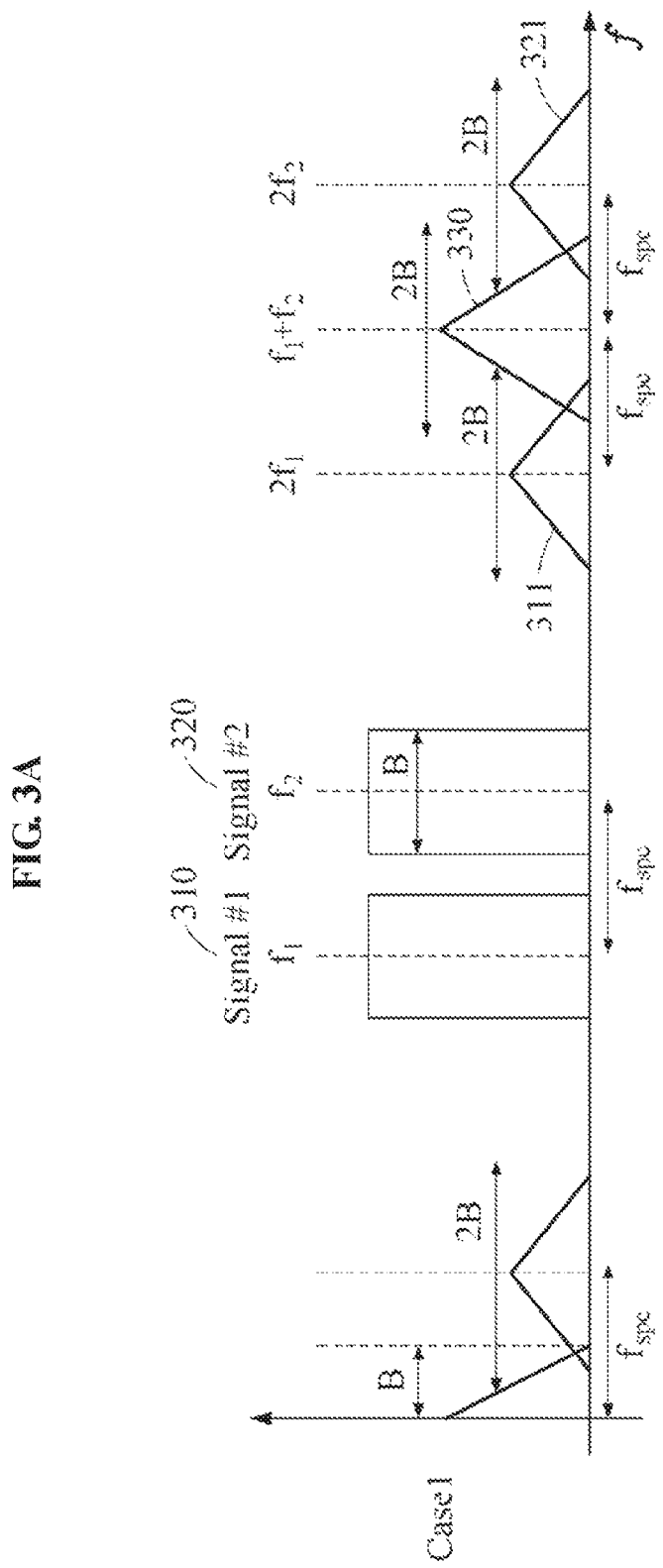

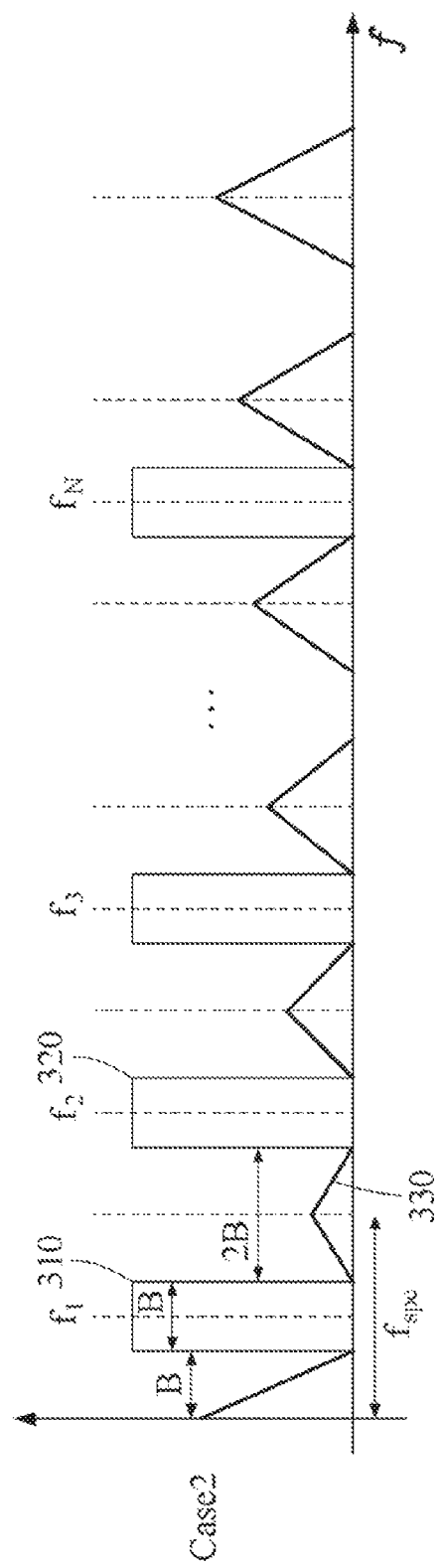

OPTICAL SIGNAL TRANSMISSION SYSTEM AND METHOD OF ALLOCATING CENTER FREQUENCIES OF INTERMEDIATE FREQUENCY (IF) CARRIERS FOR FREQUENCY DIVISION MULTIPLEXING (FDM) OPTICAL FIBER LINK

CROSS-REFERENCE TO RELATED APPLICATION(S)

This application claims priority to Korean Patent Application No. 10-2016-0021359, filed Feb. 23, 2016, in the Korean Intellectual Property Office, the disclosure of which is incorporated herein by reference for all purposes.

BACKGROUND

1. Field

One or more example embodiments relate to an optical signal transmission system and method that may transmit and receive optical signals by allocating center frequencies of intermediate frequency (IF) carriers in a frequency division multiplexing (FDM) optical fiber link.

2. Description of Related Art

One or more example embodiments relate to a method of allocating center frequencies of intermediate frequency (IF) carriers to prevent distortion in view of secondary distortion components generated by chirps and chromatic dispersion of lasers in an optical link using frequency division multiplexing (FDM) transmission.

The optical link using FDM transmission employs direct amplitude modulation that converts current amplitudes of modulated signals into a power amplitude of an optical signal. In this example, due to a chirp phenomenon of a laser, an oscillation frequency may change based on an put current. In detail, the change caused by the chirp phenomenon may not have effect in a wavelength in which optical fiber chromatic dispersion is absent. However, in a wavelength in which optical fiber chromatic dispersion is present, chirps and the dispersion may be combined and signal distortion components may appear.

U.S. Pat. No. 5,608,562 discloses a structure using a dispersion compensation fiber (DCF) to eliminate effects by fiber chromatic dispersion. However, in the structure of U.S. Pat. No. 5,608,562, an optical fiber of a length corresponding to a cumulative amount of dispersion of an optical fiber line needs to be inserted, and thus a feedback structure is required and a cost for implementation may increase.

Further, U.S. Pat. No. 7,945,172 discloses a dispersion compensation device of a feedforward structure using a predistortion circuit. However, in the structure of U.S. Pat. No. 7,945,172, an amplitude or phase of a separate dispersion compensation path, or a delay with respect to the original signal needs to be controlled precisely, and thus a size of the device and a cost may increase.

Accordingly, an optical signal transmission method that may prevent signal distortion without using a dispersion compensation optical fiber or performing complex signal processing is provided herein.

SUMMARY

An aspect provides an optical signal transmission system and method that may prevent signal distortion without using a dispersion compensation optical fiber or performing complex signal processing.

According to an aspect, there is provided an optical signal transmission method including determining a center frequency interval between modulated signals based on a bandwidth of the modulated signals, reallocating center frequencies to the modulated signals based on the center frequency interval between the modulated signals, and converting the modulated signals reallocated the center frequencies from electrical signal into optical signal and transmitting the optical signal.

The determining may include determining a multiple of the bandwidth of the modulated signals to be the center frequency interval between the modulated signals.

The determining may include determining a multiple of a center frequency of a modulated signal having a lowest center frequency, among the modulated signals, to be the center frequency interval between the modulated signals.

The reallocating may include reallocating a center frequency to a modulated signal having a lowest center frequency, among the modulated signals, based on a half the center frequency interval between the modulated signals.

The reallocating of the center frequencies may include reallocating respective center frequencies to the modulated signals based on an interval corresponding to the center frequency interval between the modulated signals, from the center frequency of the modulated signal having the lowest center frequency, among the modulated signals.

The optical signal transmission method may further include combining the modulated signals reallocated the center frequencies into a single signal and multiplexing the single signal, and the converting may include converting from electrical signal into optical signal by applying amplitude modulation to the multiplexed signal.

According to another aspect, there is also provided an optical signal reception method including converting a received optical signal into an electrical signal, and dividing the electrical signal into modulated signals and processing the modulated signals. The optical signal may be generated by determining a center frequency interval between the modulated signals based on a bandwidth of the modulated signals and converting the modulated signals reallocated center frequencies based on the center frequency interval between the modulated signals.

The center frequency interval may be determined based on a multiple of the bandwidth of the modulated signals.

The center frequency interval may be determined based on a multiple of a center frequency of a modulated signal having a lowest center frequency, among the modulated signals.

A modulated signal having a lowest center frequency, among the modulated signals, may be reallocated a center frequency based on a half the center frequency interval between the modulated signals.

According to still another aspect, there is also provided an optical signal transmission apparatus including a processor configured to determine a center frequency interval between modulated signals based on a bandwidth of the modulated signals or a center frequency of a modulated signal having a lowest center frequency, among the modulated signals, and reallocate center frequencies to the modulated signals based on the center frequency interval between the modulated signals, and an optical signal transmitter configured to convert the modulated signals reallocated the center frequencies from electrical signal to optical signal, and transmit the optical signal.

The processor may be configured to determine a multiple of the bandwidth of the modulated signals to be the center frequency interval between the modulated signals.

The processor may be configured to determine a multiple of a center frequency of a modulated signal having a lowest center frequency, among the modulated signals, to be the center frequency interval between the modulated signals.

The processor may be configured to reallocate a center frequency to a modulated signal having a lowest center frequency, among the modulated signals, based on a half the center frequency interval between the modulated signals.

The processor may be configured to reallocate respective center frequencies to the modulated signals based on an interval corresponding to the center frequency interval between the modulated signals, from the center frequency of the modulated signal having the lowest center frequency, among the modulated signals.

The optical signal transmitter may be configured to combine the modulated signals reallocated the center frequencies into a single signal, multiplex the single signal, and convert from electrical signal into optical signal by applying amplitude modulation to the multiplexed signal.

According to yet another aspect, there is also provided an optical signal reception apparatus including an optical signal receiver configured to convert a received optical signal into an electrical signal, and a processor configured to divide the electrical signal into modulated signals and process the modulated signal. The optical signal may be generated by determining a center frequency interval between the modulated signals based on a bandwidth of the modulated signals and converting the modulated signals reallocated center frequencies based on the center frequency interval between the modulated signals.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIGS. 3A and 3B illustrate examples of allocated center frequencies according to an example embodiment;

DETAILED DESCRIPTION

Figure 1:
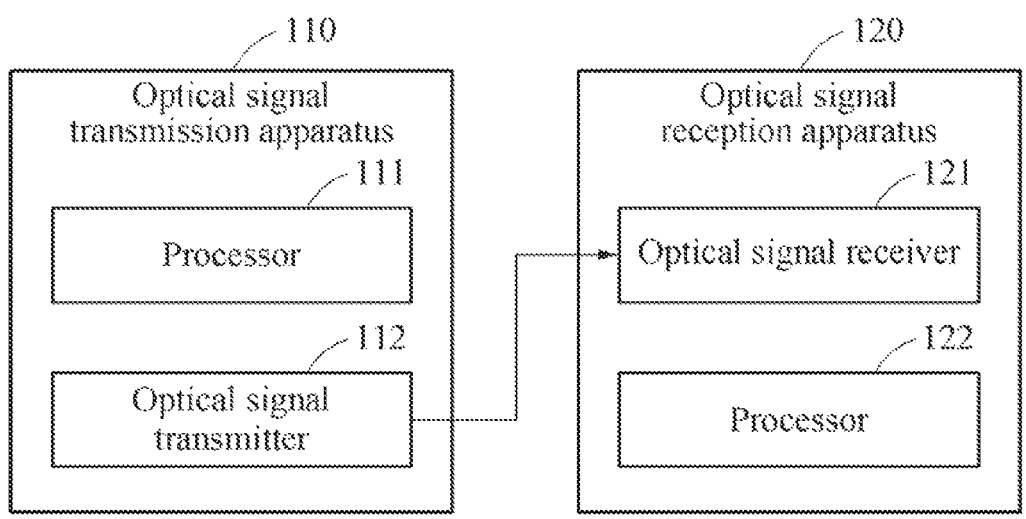
FIG. 1 is a diagram illustrating an optical signal transmission system according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure. An optical signal transmission method according to example embodiment may be performed by an optical signal transmission apparatus. Further, an optical signal reception method according to an example embodiment may be performed by an optical signal reception apparatus.

FIG. 1 is a diagram illustrating an optical signal transmission system according to an example embodiment.

Referring to FIG. 1, the optical signal transmission system may include an optical signal transmission apparatus 110 and an optical signal reception apparatus 120.

The optical signal transmission system may include an optical link using frequency division multiplexing (FDM) transmission. The optical signal transmission system may allocate center frequencies to modulated signals in view of secondary distortion components generated by chirps and chromatic dispersion of lasers.

The optical signal transmission apparatus 110 may transmit modulated signals having intermediate frequencies (IFs) to the optical signal reception apparatus 120 through the optical link.

In this example, a processor 11 of the optical signal transmission apparatus 110 may determine a center frequency interval between the modulated signals based on a bandwidth of the modulated signals. In detail, the processor 111 may determine a multiple of the bandwidth of the modulated signals to be the center frequency interval between the modulated signals.

For example, the processor 111 may set a frequency interval $f_{spc}$ between modulated signals to be three times a bandwidth B of the modulated signals. Further, in a case in which interference by a distortion component of a modulated signal is allowed, the processor 111 may set the frequency interval $f_{spc}$ between the modulated signals to be less than three times the bandwidth B of the modulated signals. The processor 111 may set the frequency interval $f_{spc}$ between the modulated signals to excess three times the bandwidth B of the modulated signals.

The processor 111 may reallocate center frequencies to the modulated signals based on the determined center frequency interval between the modulated signals. In this example, the processor 111 may reallocate a center frequency to a modulated signal having a lowest center frequency, among the modulated signals, based on a half the center frequency interval between the modulated signals. For example, the processor 111 may reallocate a center frequency $f_1$ to the modulated signal having the lowest center frequency, among the modulated signals, based on an odd-number multiple of the half the frequency interval $f_{spc}$. In detail, in a case in which the bandwidth B corresponds to 20 megahertz (MHz), the processor 111 may determine the frequency interval $f_{spc}$ between the modulated signals to be 60 MHz. The processor 111 may reallocate one of 30 MHz, 90 MHz, . . . , or $(2n-1)\times 60/2$ MHz as the center frequency $f_1$.

Further, the processor 111 may reallocate respective center frequencies to the modulated signals based on an interval corresponding to the center frequency interval between the modulated signals, from the center frequency of the modulated signal having the lowest center frequency, among the modulated signals.

An optical signal transmitter 112 of the optical signal transmission apparatus 110 may convert the modulated signals reallocated the center frequencies from electrical signal into optical signal and transmit the optical signal.

In this example, the optical signal transmitter 112 may combine the modulated signals reallocated the center frequencies into a single signal and multiplex the single signal.

The optical signal transmitter 112 may convert a property of the multiplexed signal from electrical signal into optical signal by applying amplitude modulation to the multiplexed signal. The optical signal transmitter 112 may transmit the optical signal to the optical signal reception apparatus 120 through the optical link.

The optical signal reception apparatus 120 may receive the optical signal through an optical signal receiver 121 connected with the optical signal transmitter 112 through the optical link. The optical signal receiver 121 may convert the received optical signal into an electrical signal. In this example, the signal converted into the electrical signal may be a signal generated by multiplexing modulated signals. A processor 122 of the optical signal reception apparatus 120 may demultiplex the multiplexed signal and divide the signal into modulated signals. The processor 122 may process the divided modulated signals separately.

The optical signal transmission system may reallocate a center frequency of an IF, thereby preventing signal distortion without using a dispersion compensation optical fiber or performing complex signal processing like related arts.

Figure 2:
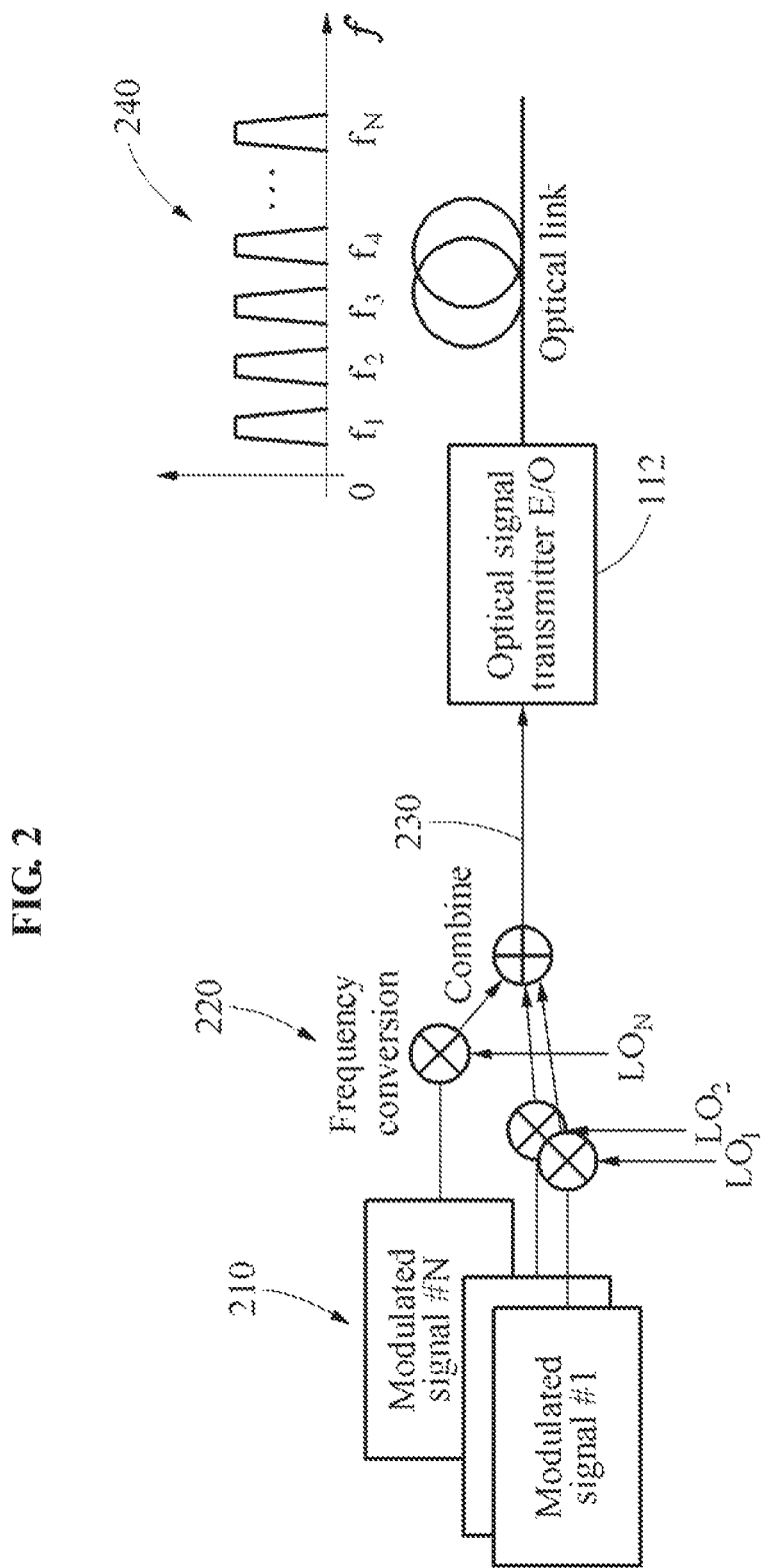
FIG. 2 illustrates an optical signal transmission process according to an example embodiment.

FIG. 2 illustrates an optical signal transmission process according to an example embodiment.

Referring to FIG. 2, a signal generator 210 of the optical signal transmission apparatus 110 may generate a number of baseband or RF-band modulated signals.

In this example, the processor 111 of the optical signal transmission apparatus 110 may determine an interval corresponding to a center frequency interval between the modulated signals, and reallocate respective center frequencies to the modulated signals based on the determined interval.

A signal converter 220 of the optical signal transmission apparatus 110 may up-convert the modulated signals to respective ifs reallocated to the modulated signals.

A combiner 230 of the optical signal transmission apparatus 110 may combine the up-converted modulated signals and output a signal multiplexed in a frequency domain.

The optical signal transmitter 112 may convert the signal multiplexed in the frequency domain from electrical signal into optical signal (E/O) through amplitude modulation, and transmit the optical signal through an optical link.

FIGS. 3A and 3B illustrate examples of allocated center frequencies according to an example embodiment.

For example, a frequency $f_1$ and a frequency $f_2$ may be allocated to a modulated signal #1 310 and a modulated signal #2 320, respectively. A bandwidth of the modulated signals may be denoted by B, and frequency components in a band may be the same in terms of size. Further, a center frequency interval between the modulated signals may be denoted by $f_{spc}$.

FIG. 3A illustrates Case 1 in which an optical signal transmission system according to a related art allocates center frequencies to modulated signals.

Secondary distortion components may be represented based on sum and difference components of center frequencies and secondary harmonic components. For example, as shown in Case 1, a secondary distortion component 330 having a bandwidth 2B may be generated at a frequency of $f_1+f_2$ corresponding to a sum of the center frequencies. Further, a secondary distortion component between frequency components present in the bandwidth B may be generated as well. Thus, as shown in Case 1, distortion components 311 and 321 having the bandwidth 2B may be generated at respective center frequencies of the distortion components.

In addition, an amplitude of a distortion component may increase in proportion to a length of an optical fiber.

FIG. 3B illustrates Case 2 in which an optical signal transmission system according to an example embodiment allocates center frequencies to modulated signals.

In a case in which N modulated signals are disposed at the same frequency interval, a frequency range in which a secondary distortion component $f_{dist}$ is generated may be expressed by Equation 1.

$(m-1)f_{spc}-B<f_{dist}<(m-1)f_{spc}+B (f_j-f_k$ component, $m=1,2,\ldots,N)$, $2f_1+(m-1)f_{spc}-B-f_{dist}<2f_1+(m-1)f_{spc}+B (f_j+f_k$ component, $m=1,2,\ldots,2N-1)$ [Equation 1]

In Equation 1, $f_1$ denotes a center frequency of a modulated signal having a lowest center frequency, among modulated signals.

According to Equation 1, in a case in which the frequency interval $f_{spc}$ between the modulated signals is three times the bandwidth, and $f_1$ is an even-number multiple of a half the frequency interval $f_{spc}$, a distortion component of a bandwidth 2B may be generated at a center frequency of each of the modulated signals. Further, in a case in which the frequency interval $f_{spc}$ between the modulated signals is three times the bandwidth, and $f_1$ is an odd-number multiple of the half the frequency interval a distortion component of a bandwidth 2B may be generated not to overlap with center frequencies of the modulated signal #1 310 and the modulated signal #2 320.

Thus, the processor 111 of the optical signal transmission apparatus 110 may determine the frequency interval $f_{spc}$ between the modulated signals to be three times the bandwidth B, and determine $f_1$ to be an odd-number multiple of the half the frequency interval $f_{spc}$, thereby preventing interference between the modulated signals and distortion components while utilizing frequencies most efficiently, as shown in Case 2 of FIG. 3B.

Figure 4:
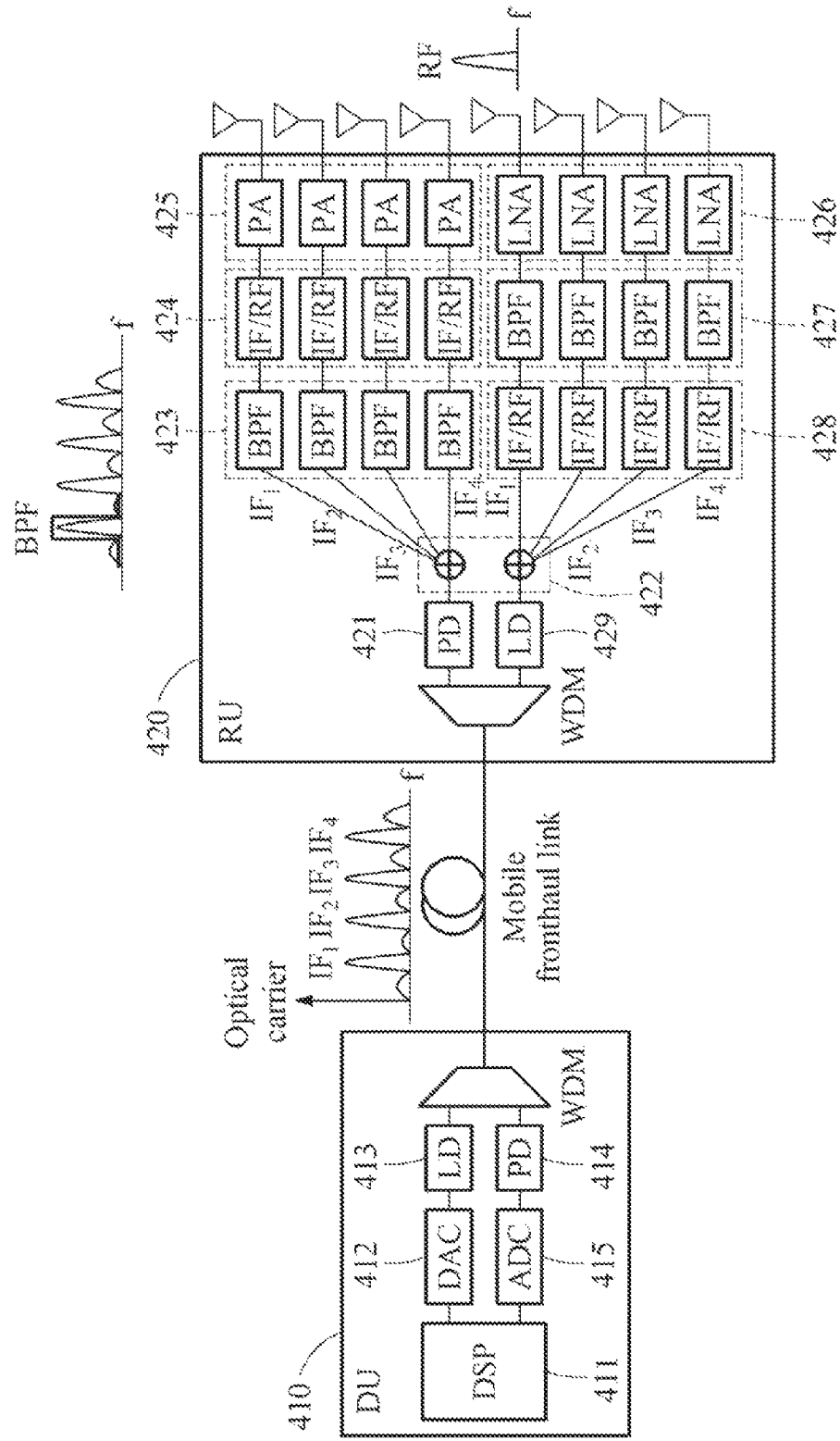
FIG. 4 illustrates an example of an optical signal transmission system according to an example embodiment.

FIG. 4 illustrates an example of an optical signal transmission system according to an example embodiment.

FIG. 4 illustrates an example of applying the optical signal transmission system to a mobile fronthaul link using FDM analog optical transmission. In this example, a base station may include four transmit antennas and four receive antennas, and the same RF frequency may be used for transmission and reception.

In downstream transmission, a digital unit (DU) 410 provided in the base station may generate four modulated signals corresponding to the four transmit antennas through FDM using a digital signal processor (DSP) 411 and a digital-to-analog converter (DAC) 412. The DU 410 may convert properties of the modulated signals from electrical signal into optical signal using a laser diode (LD) 413.

The DU 410 may apply amplitude modulation to the optical signal using wavelength division multiplexing (WDM), multiplex the optical signal, and output a multiplexed IF optical signal. In this example, the multiplexed IF optical signal may be transmitted to a radio unit (RU) 420 through an optical link while being carried on an optical carrier. Further, the optical signal transmission system may reallocate center frequencies of IFs of the modulated signals included in the multiplexed IF optical signal, thereby preventing interference between the original signal and a distortion signal.

The RU 420 may convert the received multiplexed IF optical signal into an electrical signal through a photo diode (PD) 421. The RU 420 may divide the electrical signal into IF signals corresponding to a number of the receive antennas using an RF divider 422.

The RU 420 may restrain distortion components and adjacent IF signals by filtering the IF signals corresponding to the receive antennas using band-pass filters (BPFs) 423.

The RU 420 may perform frequency conversion from IF to RF using mixers 424, amplify the RF signals using power amplifiers (PAs) 425, and transmit the amplified signals to the receive antennas.

In upstream transmission, the RU 420 may amplify a signal received from a receive antenna to a preset level through a low-noise amplifier (LNA) 426. The RU 420 may perform, with respect to the amplified signal, frequency conversion to IF corresponding to the amplified signal using a BPF 427 and a mixer 428.

The RU 420 may combine the signal with signals received from the other receive antennas into a single signal, and perform FDM with respect to the single signal. The RU 420 may convert a property of the multiplexed signal from electrical signal into optical signal using an LD 429.

The RU 420 may apply amplitude modulation to the optical signal using WDM, multiplex the optical signal, and transmit the multiplexed IF optical signal to the DU 410.

The DU 410 may convert the received multiplexed IF optical signal into an electrical signal through a PD 414. The DU 410 may convert the electrical signal into a digital signal using an analog-to-digital converter (ADC) 415, and divide the digital signal into IF signals. The DSP 411 may process the divided signals separately.

Figure 5:
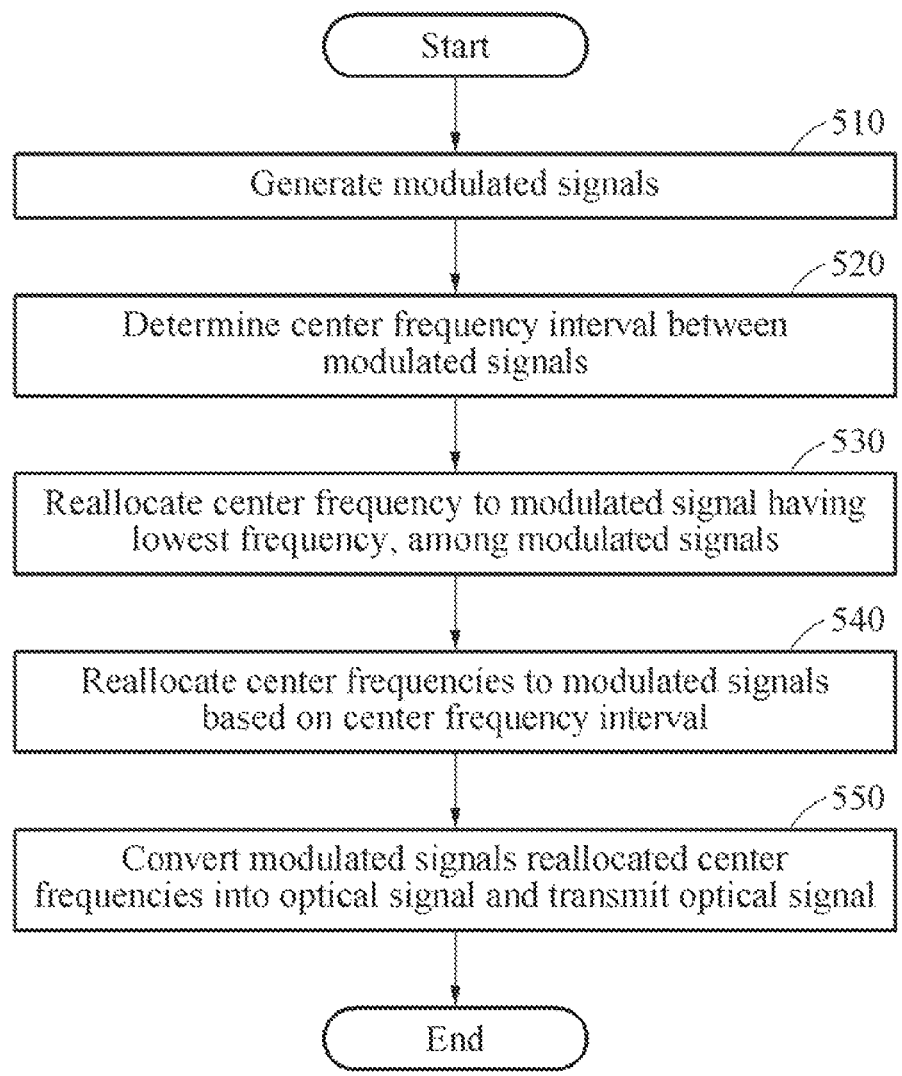
FIG. 5 is a flowchart illustrating an optical signal transmission method according to an example embodiment.

FIG. 5 is a flowchart illustrating an optical signal transmission method according to an example embodiment.

Referring to FIG. 5, in operation 510, the optical signal transmission apparatus 110 may generate modulated signals. In this example, center frequencies may be allocated to the generated modulated signals.

In operation 520, the optical signal transmission apparatus 110 may determine a center frequency interval between the modulated signals based on a bandwidth of the generated modulated signals. In this example, the optical signal transmission apparatus 110 may set a multiple of the bandwidth B of the modulated signals to be the frequency interval $f_{spc}$ between the modulated signals.

In operation 530, the optical signal transmission apparatus 110 may reallocate a center frequency $f_1$ to a modulated signal having a lowest frequency, among the modulated signals, based on an odd-number multiple of a half the frequency interval $f_{spc}$.

In operation 540, the optical signal transmission apparatus 110 may reallocate center frequencies to the modulated signals based on the determined center frequency interval between the modulated signals. In this example, the optical signal transmission apparatus 110 may reallocate respective center frequencies to the modulated signals based on an interval corresponding to the center frequency interval between the modulated signals, from the center frequency of the modulated signal having the lowest center frequency, among the modulated signals.

In operation 550, the optical signal transmission apparatus 110 may convert the modulated signals reallocated the center frequencies into an optical signal, and transmit the optical signal.

Figure 6:
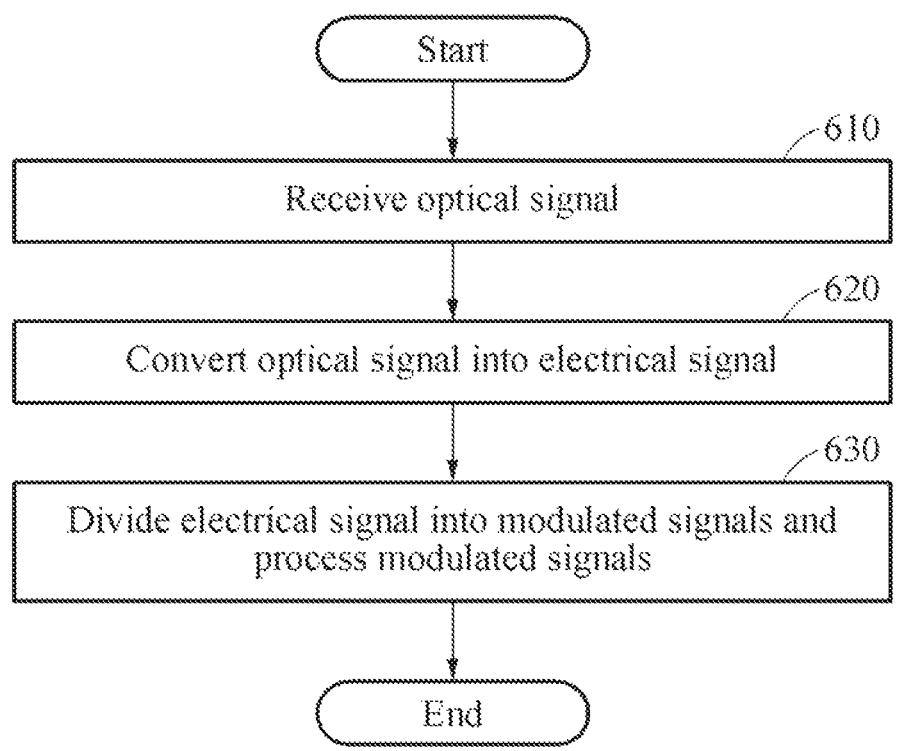
FIG. 6 is a flowchart illustrating an optical signal reception method according to an example embodiment.

FIG. 6 is a flowchart illustrating an optical signal reception method according to an example embodiment.

Referring to FIG. 6, in operation 610, the optical signal reception apparatus 120 may receive an optical signal from the optical signal transmission apparatus 110 through an optical link. In this example, the optical signal may be generated by determining a center frequency interval between modulated signals based on a bandwidth of the modulated signals, and converting the modulated signals reallocated center frequencies based on the center frequency interval between the modulated signals.

In operation 620, the optical signal reception apparatus 120 may convert the received optical signal into an electrical signal. In this example, the signal converted into the electrical signal may be a signal generated by multiplexing modulated signals.

In operation 630, the optical signal reception apparatus 120 may divide the electrical signal into modulated signals through demultiplexing. The optical signal reception apparatus 120 may process the divided modulated signals separately.

According to an example embodiment, by reallocating a center frequency of an IF based on a bandwidth of modulated signals or a center frequency of a modulated signal having a lowest center frequency, among the modulated signals, signal distortion may be prevented without using a dispersion compensation optical fiber or performing complex signal processing like related arts.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical signal transmission method comprising:
   determining a center frequency interval between modulated signals based on a bandwidth of the modulated signals;
   reallocating center frequencies to the modulated signals based on the center frequency interval between the modulated signals; and
   converting the modulated signals reallocated the center frequencies from electrical signal into optical signal and transmitting the optical signal, wherein the determining comprises determining a multiple of the bandwidth of the modulated signals to be the center frequency interval between the modulated signals.

2. The optical signal transmission method of claim 1, wherein the reallocating comprises reallocating a center frequency to one of the modulated signals having a lowest center frequency, based on a half of the center frequency interval between the modulated signals.

3. The optical signal transmission method of claim 2, wherein the reallocating of the center frequencies comprises reallocating respective center frequencies to the modulated signals based on an interval corresponding to the center frequency interval between the modulated signals, from the center frequency of the one of the modulated signals having the lowest center frequency.

4. The optical signal transmission method of claim 1, further comprising:
combining the modulated signals reallocated the center frequencies into a single signal and multiplexing the single signal;
wherein the converting comprises converting the multiplexed signal from electrical signal into optical signal by applying amplitude modulation to the multiplexed signal.

5. An optical signal reception method comprising:
converting a received optical signal into an electrical signal; and
dividing the electrical signal into modulated signals and processing the modulated signals,
wherein the optical signal is generated by determining a center frequency interval between the modulated signals based on a bandwidth of the modulated signals and converting the modulated signals reallocated center frequencies based on the center frequency interval between the modulated signals, and
wherein the center frequency interval is determined based on a multiple of the bandwidth of the modulated signals.

6. The optical signal reception method of claim 5, wherein one of the modulated signals having a lowest center frequency is reallocated a center frequency based on a half of the center frequency interval between the modulated signals.

7. An optical signal transmission apparatus comprising:
a processor configured to determine a center frequency interval between modulated signals based on a bandwidth of the modulated signals or a center frequency of one of the modulated signals having a lowest center frequency, and reallocate center frequencies to the modulated signals based on the center frequency interval between the modulated signals; and
an optical signal transmitter configured to convert the modulated signals reallocated the center frequencies from electrical signal to optical signal, and transmit the optical signal,
wherein the processor is configured to determine a multiple of the bandwidth of the modulated signals to be the center frequency interval between the modulated signals.

8. The optical signal transmission apparatus of claim 7, wherein the processor is configured to reallocate a center frequency to one of the modulated signals having a lowest center frequency, based on a half of the center frequency interval between the modulated signals.

9. The optical signal transmission apparatus of claim 8, wherein the processor is configured to reallocate respective center frequencies to the modulated signals based on an interval corresponding to the center frequency interval between the modulated signals, from the center frequency of the one of the modulated signals having the lowest center frequency.

10. The optical signal transmission apparatus of claim 7, wherein the optical signal transmitter is configured to combine the modulated signals reallocated the center frequencies into a single signal, multiplex the single signal, and convert the multiplexed signal from electrical signal into optical signal by applying amplitude modulation to the multiplexed signal.

* * * * *